Dec. 31, 1963   J. H. PURNELL   3,116,161
METHOD FOR PREPARING A CHROMATOGRAPHIC COLUMN SUPPORT
Filed Sept. 14, 1959   6 Sheets-Sheet 1
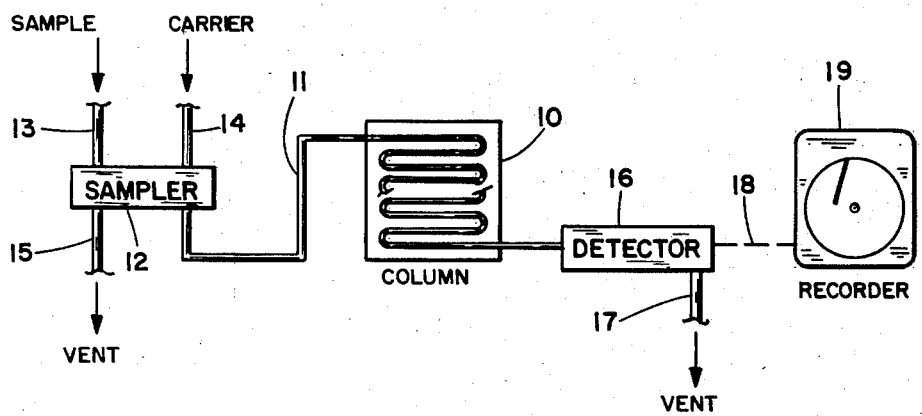
FIG. I
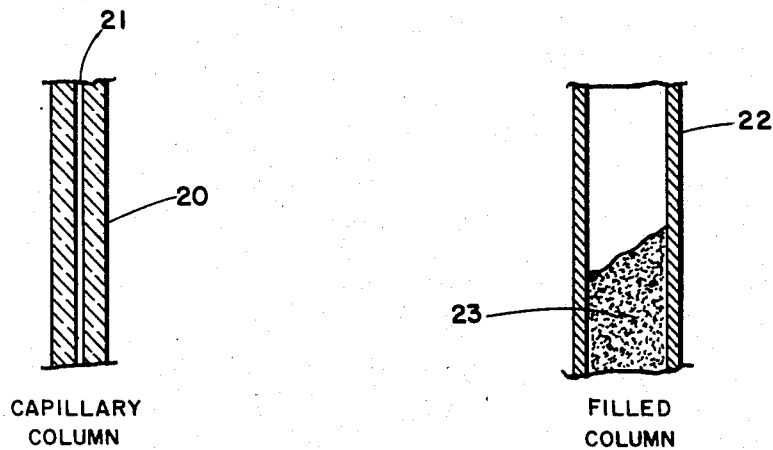
FIG. II   FIG. III
INVENTOR
JOHN HOWARD PURNELL
BY
AGENT

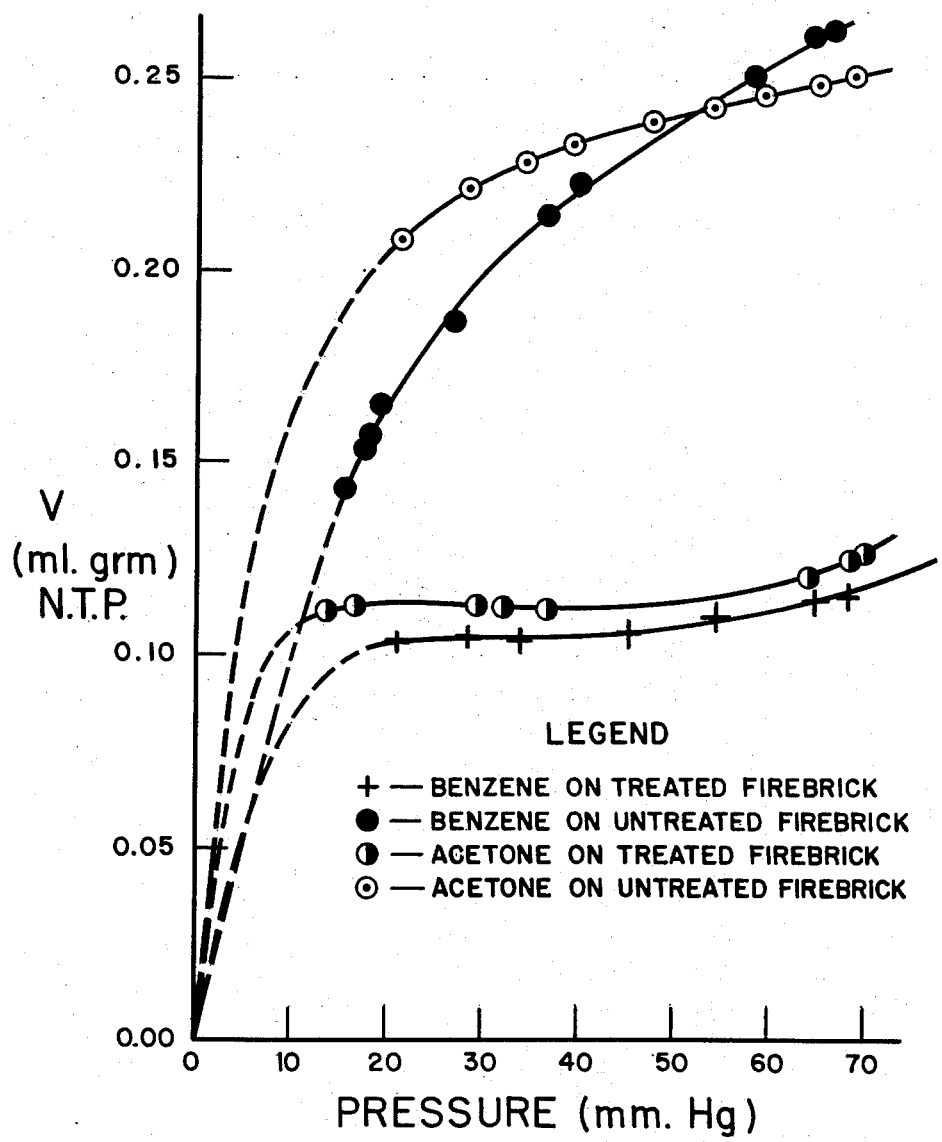

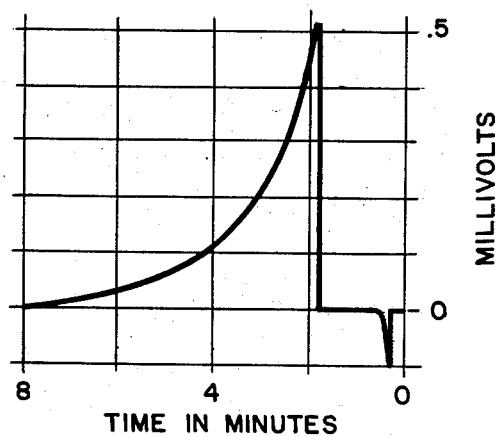
FIG. V
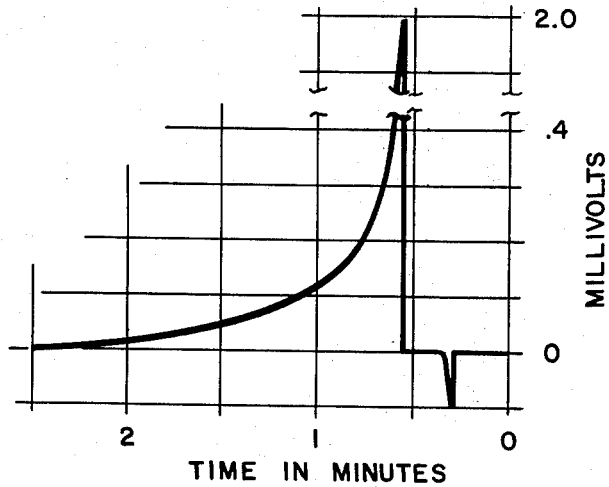
FIG. VI

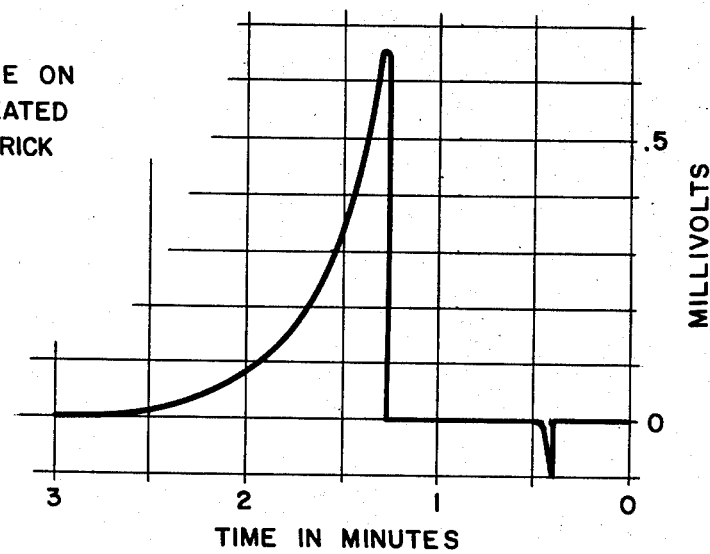
FIG. VII
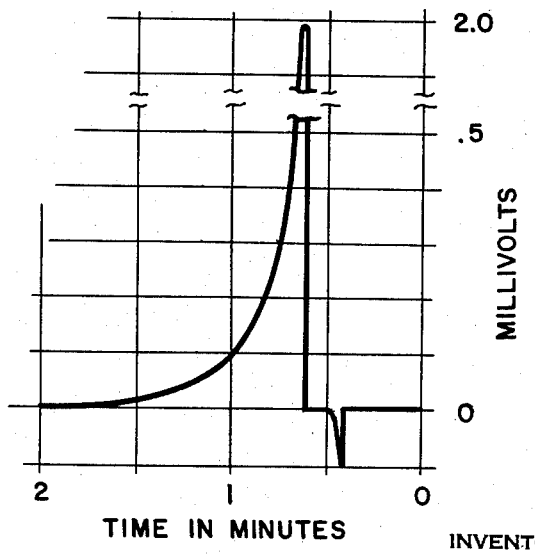
FIG. VIII

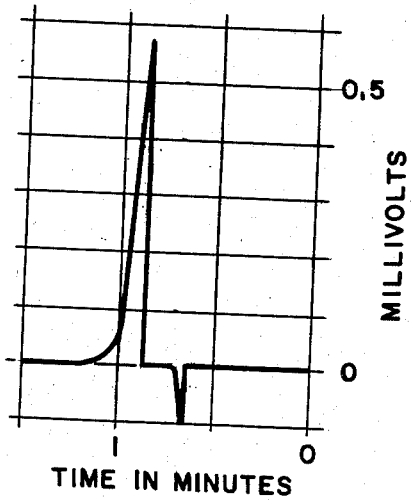
FIG. IX  CYCLOHEXANE ON UNTREATED FIREBRICK
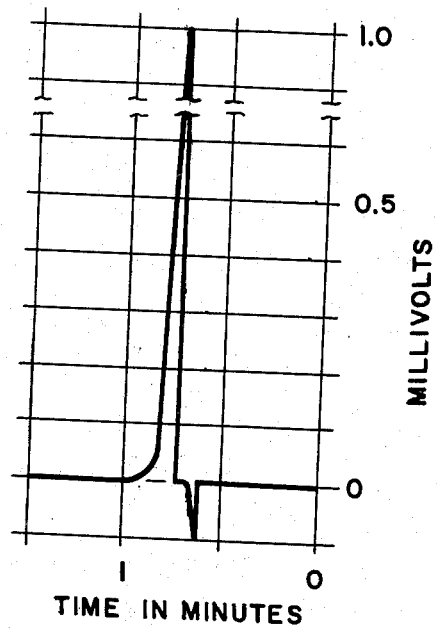
FIG. X  CYCLOHEXANE ON TREATED FIREBRICK

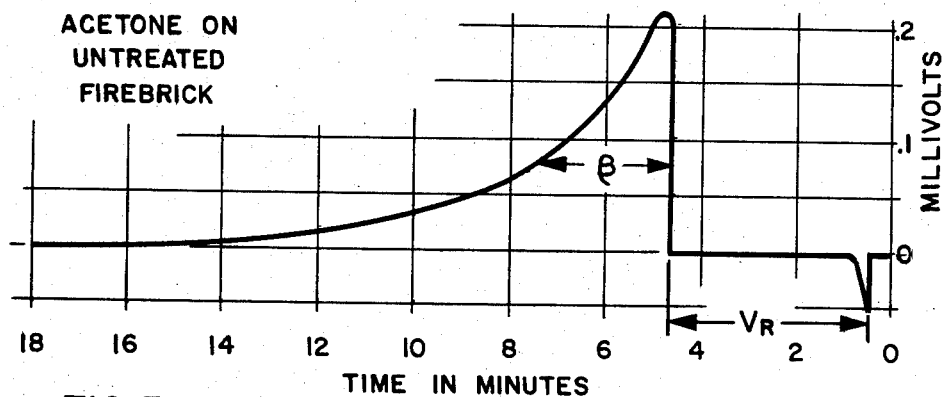
FIG. XI
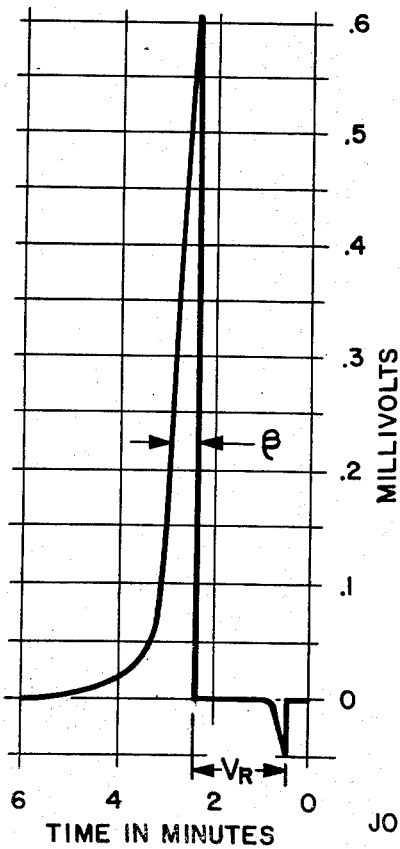
FIG. XII
INVENTOR
JOHN HOWARD PURNELL
BY
Lawrence H. Palton
AGENT

United States Patent Office 3,116,161
Patented Dec. 31, 1963

3,116,161
METHOD FOR PREPARING A CHROMATOGRAPHIC COLUMN SUPPORT
John Howard Purnell, Cambridge, England, assignor to The Foxboro Company, Foxboro, Mass., a corporation of Massachusetts
Filed Sept. 14, 1959, Ser. No. 839,862
1 Claim. (Cl. 117—118)

This invention relates to the analysis of multicomponent material in gaseous state by chromatographic separation, and has particular reference to chromatographic columns and the method of preparing surfaces therefor. This invention particularly provides chemically bonded chromatographic surfacing and the method of producing such surfacing.

Examples of general forms of chromatographic columns involved in this invention are capillary columns and filled columns. Capillary columns are open tubes whose inner walls or inner wall surfacings are sorptively active areas. Filled columns are tubes filled with granules whose surfaces or surfacings are sorptively active areas.

The general forms of chromatographic analysis involved in this invention are partition and adsorption, that is, gas-liquid chromatography and gas-solid chromatography. The capillary and filled columns each may be gas-liquid or gas-solid, as desired. Gas-liquid chromatography involves a solid covered with a liquid film as sample separation means. Gas-solid chromatography involves a solid directly acting as sample separating means.

When a gas is passed through a chromatographic column, its various components are detained, differently in time, by sorptiveness with respect to surfaces they encounter in the column. In the case of a capillary open tube column, the encountered surfacing is the inner wall of the capillary or whatever surfacing is established on the inner wall. In the case of a filled tube, the encountered surfacing is that of the sorptive granules with which the tube is filled, or whatever surfacing is established on the granules.

Capillary columns and filled column granules are selected on the basis of strength, workability, cost, sorptive abilities and the like. For example, capillary columns may be formed of glass or quartz, and filled column granules may be silica, diatomaceous earth, firebrick or alumina. Such columns and granules have sorptive sites of varying sorptive activity. Many of these sorptive sites are associated with sites of chemical activity in the form of polar groupings. These sites may be present in the natural state, may be manufactured, or may be the result of contact with atmosphere or other substances.

In gas-solid chromatography these sorptive surfaces are used as sample component separation means. In gas-liquid chromatography they are used as a foundation for a liquid film which is the sample component separation means. Where low concentrations of such films are used, the sorptive characteristic of the foundation contributes substantially to the overall sorptive reaction. Examples of such liquid films are squalane, triethanolamine, and polyethylene glycol.

Active sorptive sites, associated with chemical activity such as produced by polar groupings, result in stronger retention of certain molecules of a sample component than is accomplished on the balance of the sorptive sites within the column. This results in the retention differently in time of different molecules in a single component and causes spreading of the component wave in the column over a larger quantity of carrier gas, resulting both in a lower peak concentration of the eluted material and greater broadening of the chromatographic curve. The result is reduced column efficiency.

This invention provides means to alleviate these difficulties by reacting such polar groupings with chemical reagents whose reaction products form permanent chemically bonded surfaces on the sorptive surfaces of the column.

An example of this invention is the reaction of polar sites in the original sorptive surface layer with hexamethyldisilazane to form an organic chemical compound which is chemically bonded to the original surface layer.

It is, therefore, an object of this invention to provide a new and improved chromatographic method on a chemical basis used in a chromatographic column.

Other objects and advantages of this invention will be in part apparent and in part pointed out hereinafter and in the accompanying drawings, wherein:

FIGURE I is a schematic illustration of a chromatographic separation system according to this invention;

FIGURE II is a fragmentary illustration of a glass capillary column as involved in this invention;

FIGURE III is a fragmentary illustration of a filled column as involved in this invention, with the filling body of particles partly shown;

FIGURE IV is an experimentally derived illustration of sorption isotherms in support of the concept of this invention;

FIGURE V is a chromatogram of acetone eluted from utreated firebrick as a gas-solid column;

FIGURE VI is a chromatogram of acetone under the same conditions as that of FIGURE V with the exception that the firebrick has been treated in accordance with this invention;

FIGURE VII is a chromatogram of benzene obtained with untreated firebrick as a gas-solid column;

FIGURE VIII is a chromatogram of benzene under the same conditions as that of FIGURE VII, with the exception that the firebrick has been treated according to this invention;

FIGURE IX is a chromatogram of cyclohexane eluted from untreated firebrick as a gas-solid column;

FIGURE X is a chromatogram of cyclohexane under the same conditions as that of FIGURE IX, with the exception that the firebrick has been treated according to this invention;

FIGURE XI is a chromatogram of acetone on a gas-liquid column; and

FIGURE XII is a chromatogram of acetone under the same conditions as that of FIGURE XI, with the exception that the firebrick has been treated according to this invention prior to establishing a liquid film of squalane on the surface of the support material.

FIGURE I is illustrative of a chromatographic gas analysis system embodying this invention. In the FIGURE I showing, a chromatographic capillary column 10 is indicated with a gas inlet 11 thereto leading from a sampler unit 12 through which sample and carrier gases are selectively applied as through inlet pipes 13 and 14. The sampler is provided with a vent 15 for any switching excess gas or for the venting of the gas which is not at the moment going through the sampler to the column. Operating systems such as a programmer for the sampler and the other parts of this system are not shown in this simple schematic outline. The output of the column 10, that is, the effluent of the gas sample and carrier from the column, is directed into a detector unit 16 and then vented as at 17 The detector unit 16, like the sampler 12, may be a conventional device. The output of the detector is indicated by dotted line 18 and may be, for example, an electrical impulse transposed into a mechanical motion in the recorder 19 in conventional fashion to react to and to illustrate the percentage composition of the various components of a gas sample mixture which have been separated in the column 10.

FIGURE II is an illustration of a fragment of a capillary column such as that indicated at 10 in FIGURE I and in this instance is a glass tube 20 with a central opening therethrough as at 21. In some forms of use the capillary tube as such, with its own inner surface, may act as the solid material, that is to say, the component separation material of the column. On the other hand, such a tube may be treated on its inner surface or made rough or more sorptive, or it may have thereon a liquid film to make the device a partition type of column. A capillary column is a tube without granules. Component separation is accomplished with respect to the inner wall of the tube or surfacing thereon.

The column of FIGURE III is a fragmentary showing of a filled column wherein the tube itself, as at 22, is filled with a body of granules shown in fragment at 23. The body of granules is a mass of small particles. In one instance this body is the solid, separation material and the gas sample being travelled therethrough is separated into its various components through direct encounters with the surfaces of the granules of this body. In gas-liquid chromatography, the solid bodies are covered with a liquid, and separation of the sample components results from action with respect to this liquid.

A prior art disadvantage in chromatographic analysis is known as "tailing." This characteristic is discussed here, with reference to the pairs of FIGURES V and VI; VII and VIII; IX and X; and XI and XII. These figures are discussed later herein in relation to experimental illustrations relative to this invention.

The variation of concentration of a given component with time as it leaves the chromatographic column ideally involves a very sharp increase in concentration as soon as the first trace elutes from the column and a similarly fast decrease in concentration essentially to zero from the maximum peak concentration.

The tendency of a peak to be asymmetrical, lower than the ideal and for the total sample to be distributed through a much larger volume of carrier than that of the ideal case, is known as tailing. FIGURES V, VII, IX and XI show typical examples of tailing. Examples of the effects of tailing in practical applications of chromatography are: (1) It reduces the peak concentration and thereby the response of the detector to a particular component. Thus greater sensitivity is required if concentration is measured by conventional peak detector means. (2) The increase of the amount of carrier through which the component is distributed may cause an overlap between adjacent sample component concentrations.

The tendency toward and the extent of asymmetry is dependent upon the form of the sorption isotherm. The form of asymmetry described above as tailing is the one most commonly encountered and the results from a sorption isotherm usually described as the Langmuir type. Too much randomness in the sorptive activity may cause trailing tails. Chemical bonding according to this invention may be used to increase the efficiency of a column, according to the definition of efficiency herein.

In gas-solid chromatography, trailing tails may be corrected by modifying sorptivity according to this invention.

In gas-liquid chromatography, the procedure is to modify the sorptive activity of the support material to a point of no undesirable interference with the sorptive activity of the separation liquid film to be established on the support material. Then tailing can be controlled by selection of suitable liquid film, in proper concentration.

Expressed mathematically, column efficiency is frequently defined by the equation:

$$N = 8\left(\frac{V_r}{\beta}\right)^2$$

$N$ = the number of theoretical plates corresponding to column performance.
$V_r$ = the retention time factor in terms of the retention volume.
$\beta$ = the width of the concentration peak at $1/e$ of the peak height wherein $e$ is the base of the natural logarithm.

In comparing FIGURES XI and XII, note that due to the application of this invention the value of $N$ increases since the value of $V_r$ is reduced by a smaller percentage than the percentage reduction of $\beta$.

The need for column efficiency is illustrated by the consideration that the ability of a column to separate sample components of similar boiling points or similar partition coefficients, is primarily determined by column efficiency.

In a specific example of chemical bonding according to this invention, hexamethyldisilazane reacts quantitatively with hydroxyl groups according to the equation:

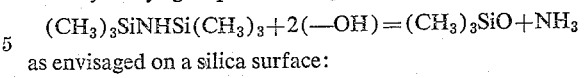

as envisaged on a silica surface:

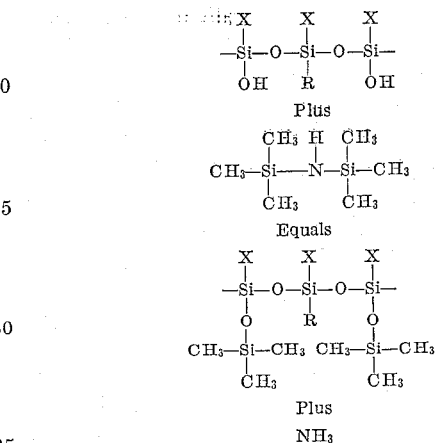

R and X represent radicals or atoms which play no part in the scheme of reaction according to this invention. Note that the reactive hydroxyl groups are quantitatively replaced by groups which may be expected to be very considerably less active as sorption sites.

Pairs of hydroxyls, at adjacent sites are not necessary to this reaction. This is borne out by the quantitative yield of ammonia obtained in reactions with known concentrations of hydroxylated materials.

Trimethylchlorosilane, $(CH_3)_3SiCl$, may be used to chemically react with hydroxyls according to this invention in applications wherein the resultant hydrochloric acid does not constitute a serious problem.

It is believed that a joint treatment involving trimethylchlorosilane giving off hydrochloric acid in its reaction with hydroxyls and hexamethyldisilazane giving off ammonia in its reaction with hydroxyls, would be very useful in disposing of a very large percentage of the hydroxyl groups. The ratio of the two reactors is such as to permit a near stoichiometric reaction between ammonia as a by-product of the hexamethyldisilazane reaction and hydrochloric acid as a by-product of the trimethylchlorosilane reaction to form ammonium chloride, which is easily removable.

When material which has been treated in accordance with this invention is used as a support material in a partition column, the efficiency of the partition column is substantially improved. It may be theorized that either the more active sorptive sites are being reacted to eliminate them from an active part in the chromatographic separation, or that the treatment of the material reduces the total number of sorptive sites. It is known, as a practical matter, that such tretament of firebrick does substantially improve the efficiency of a partition column. The improvement is evident when a comparison is made between the chromatogram obtained with acetone before and after the treatment of the support material, as illustrated in FIGURES XI and XII.

It is known that in the use of partition columns, both the efficiency of the column and the speed of the analysis can be improved by using a lower concentration liquid film.

Prior to this time, the lower limits of such reduction in liquid film concentration have been established by the sorption characteristics of the support material. In the case of polar sample components, such as acetone and methanol, such difficulty has been encountered even when the liquid film amounted to as much as 20% of the weight of the supporting firebrick. In fact, as a practical matter, boiling point basis separating films such as squalane often are not used for separation of polar sample components, because of this difficulty.

In accordance with this invention, the polar sites on the support material are reacted with materials which are capable of producing reaction products which form permanent chemical bonds with the surface of the material. These reaction products may be predetermined to have non-polar characteristics. They may be selected from a variety of suitable organic chemical groups. An example would be a hydrocarbon residue.

The treatment described herein results in the reduction of the total sorptivity of the surface of the material being treated. This is readily illustrated by the resulting sorptive isotherms determined experimentally and illustrated in FIGURE IV.

It is thought that this treatment results in chemical reaction of the more active sorptive sites, which are at the same time the more chemical reactive sites, the remaining effective sorptive sites being more uniform.

It also may be theorized that the reaction of the treating material with the polar sites on the sorptive material merely reduces the total number of sorptive sites and thus provides a better column.

In any case, whichever theoretical explanation is correct, it is known that substantial improvement in column efficiency is obtained on firebrick which has been treated in accordance with this invention. The results of such treatment, as shown, are to improve the efficiency of the column when separating polar materials such as acetone, as illustrated in FIGURES V and VI, polarizable materials such as benzene as illustrated in FIGURES VII and VIII and non-polar materials such as cyclohexane as illustrated in FIGURES IX and X. Further work has been done with similar results on methanol, acetaldehyde, 1-hexene, diethylether, normal hexane and isopropyl alcohol.

In gas-solid chromatography applications, chemical treatment according to this invention may be accomplished in any of three forms:

(1) The sorptively active sites with chemical activity associations may be essentially eliminated by full treatment, leaving only such other forms of sorptivity as may be present. Such sorptive remainders may be used when their pattern of sorptivity is sufficient to suitably separate the components of interest of the sample mixture.

(2) The sorptively active sites with chemical activity associations may be partially eliminated by partial treatment. When a small amount of treatment material is applied, it is expected that they will attack the more active sites and reduce the random sorptive activity while leaving preselected pattern of sorptive activity.

(3) The sorptively active sites with chemical activity associations may be essentially eliminated by full treatment, with the treatment material selected to leave a preselected residue of sorptively active material. It is contemplated, for example, that something other than a paraffin-like surfacing would be formed in this manner by selection of residue from the numerous possible organic chemical groups.

In this connection, base materials which are poor in sorptive sites with chemical associations, may be treated chemically to produce such active sites. These new active sites, if not usable as produced, may be then altered in one of the three ways mentioned above. This concept of active site production is theoretical.

*Examples*

Experiments have been carried out successfully in support of the disclosures of this invention. These experiments are illustrated in FIGURES IV through XII.

FIGURE IV illustrates experimentally determined sorption isotherms for two sorbates on dry firebrick, both untreated and treated with the reagent according to this invention. The initial assumption of the presence of hydroxyls on the surface of the untreated firebrick is substantiated by the fact that as seen in FIGURE IV, sorption of each sorbate is considerably reduced by the treatment. The isotherms, determined at 49.6° C., are plotted in terms of equilibrium vapor pressure of sorbate over the brick in millimeters of mercury versus the volume of sorbate vapour adsorbed, reduced to 0° C. and one atmosphere of pressure per gram of brick.

In the FIGURE IV illustration, benzene and acetone were used separately as sample components on first dry and then treated firebrick. The identification circles and crosses on the curves mark the points of actual value readings in these experiments.

FIGURES V through X are gas-solid chromatograms of the indicated sample components, i.e., acetone, benzene and cyclohexane. Each is on the basis of first untreated firebrick and then treated firebrick, both taken on the same length of column.

While the indicated data are shown for one component in each case, the actual data could be obtained either in chromotographic elution of single components or in the separation of multicomponent mixtures. The single component effects are illustrated here for the sake of simplicity and clarity of explanation.

In each case, the peak height of the plot is increased in the treated firebrick situation as compared to the untreated firebrick situation, thus placing a less stringent requirement on the sensitivity of the detector used in the apparatus.

These experiments, as shown, demonstrate greater column efficiency as defined herein, increased peak height, and faster operation. They also demonstrate potentially lower separation but as is well known, the retention time and retention volume of any component can be increased by increasing the length of the chromotographic column. The peak width ($\beta$ in the efficiency formula herein) increases much less rapidly than does the retention time and thus column operation can be improved by increasing column length. If two columns were built, one with treated and the other with untreated firebrick, of different lengths such as to have identical retention volumes, the improved operation of the treated column compared to the untreated one would be substantially greater than the improvement shown on the experimental data shown herein, which was obtained on columns of the same length.

Thus the improvement in column operation as shown in FIGURES V–X can be used in practical application by lengthening the column, if required, to obtain the required component separation.

In such comparisons, it is assumed that other column variables, such as carrier flow rate, diameter, packing density, particle size, etc. have been held constant.

The total spreads of the peaks are materially reduced in the treated firebrick situation compared with the untreated firebrick situation.

The asymmetry of each peak is reduced in the treated firebrick situation compared with the untreated firebrick situation.

While the retention volume, as indicated by the time between the air peak and the component peak, is reduced in each treated firebrick situation, the width of the chromatographic peak is reduced more than proportionately and the ratio of the retention volume to width of chromatographic peak (in terms of column efficiency as previously defined) is increased in the treated firebrick situation compared with the untreated firebrick situation.

FIGURES XI and XII are gas-liquid chromatograms of acetone on a squalane film on treated and untreated firebrick. Similar shortening of air peak to component peak distance and lessening of curve width may be noted.

Hexamethyldisilazane may be applied to the material to be treated in gaseous form, and if desired, any excess can be driven off, for example, by heat or flushing. Hexamethyldisilazane and trimethylchlorosilane are normally in liquid state when used according to this invention.

Some materials may not have, in themselves, surface groupings such as hydroxyls. Such groupings may be acquired or manufactured. Glass, for example, takes on surface layering from exposure to air and this layering has hydroxyl groupings disposed therein.

Column efficiency as discussed herein re separations and chromatograms involves less assymmetry, shorter total duration, and higher component peaks, and is expressed in the formula $$N = 8 \left( \frac{V_r}{\beta} \right)^2$$

explained hereinbefore.

This invention relates to gas chromatography in the sense that sample components are in the gaseous state in the chromatographic column. The word gaseous is intended to include vapors.

The chromatographic improvement of this invention is in terms of efficiency as defined herein, sensitivity, and separation, these factors being taken singly or in various combinations with some degree of interdependency.

This invention therefore provides a new and improved method of producing chromatographic column surfacing.

As many embodiments may be made of the above invention and as changes may be made in the embodiments set forth above without departing from the scope of the invention, it is to be understood that all matter hereinbefore set forth or shown in the accompanying drawings is to be interpreted as illustrative only and not in a limiting sense.

I claim:

In gas liquid chromatography, the column preparatory method of chemically and permanently modifying the overall sorptive activity of the surface only of inorganic siliceous support material to a point of effectively zero interference with the sorptive activity of the separation liquid film to be established on the support material, wherein said support material prior to such modification has random OH radicals, said method comprising treating said support material non-catalytically with hexamethyldisilazane according to the equation:

$$(CH_3)_3SiNHSi(CH_3)_3 + 2(-OH) = (CH_3)_3SiO + NH_3$$

as envisaged on the silica surface of said material, with the result that a permanently chemically bonded, paraffinic, overall non-sorptive organic surface is achieved on a body which remains inorganic and which also remains effective in its chromatographic substrate function.

References Cited in the file of this patent
UNITED STATES PATENTS

| | | |
|---|---|---|
| 2,920,478 | Golay | Jan. 12, 1960 |
| 2,967,170 | Merker | Jan. 3, 1961 |
| 2,985,007 | Boeke | May 23, 1961 |
| 3,047,527 | Molotsky et al. | July 31, 1962 |
| 3,047,992 | Jones | Aug. 7, 1962 |

OTHER REFERENCES

An article entitled "The Chromatographic Analysis of Hydrocarbon Mixtures," by Bradford et al. in the Journal of Institute of Petroleum, vol. 41, 1955, pages 87 and 88.

An article entitled "Gas Chromatography," in the Oil and Gas Journal, Dec. 17, 1956, pages 126–132.

Gas Chromatography by Coates et al., Academic Press Inc., New York, 1958, pages 31–39.

Horning et al.: Polyester Liquid Phases in Gas Liquid Chromatography, in Chemistry and Industry, pages 751–752, June 20, 1959.